(12) United States Patent
Lin (10) Patent No.: US 10,627,829 B2
(45) Date of Patent: Apr. 21, 2020

(54) LOCATION-BASED CONTROL METHOD AND APPARATUS, MOVABLE MACHINE AND ROBOT

(71) Applicant: SZ DJI TECHNOLOGY CO., LTD., Shenzhen (CN)

(72) Inventor: Ren Lin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 37 days.

(21) Appl. No.: 15/582,159

(22) Filed: Apr. 28, 2017

(65) Prior Publication Data

US 2017/0235314 A1    Aug. 17, 2017

Related U.S. Application Data

(63) Continuation of application No. PCT/CN2014/090085, filed on Oct. 31, 2014.

(51) Int. Cl.
*G05D 1/02* (2020.01)
*G06K 9/00* (2006.01)
*G06K 9/46* (2006.01)

(52) U.S. Cl.
CPC ......... *G05D 1/0246* (2013.01); *G05D 1/0234* (2013.01); *G06K 9/00664* (2013.01); *G06K 9/4652* (2013.01); *G06K 9/4661* (2013.01)

(58) Field of Classification Search
CPC ............... G05D 1/0246; G05D 1/0234; G06K 9/00664; G06K 9/4652; G06K 9/4661
See application file for complete search history.

(56) References Cited

U.S. PATENT DOCUMENTS

| | | | | |
|---|---|---|---|---|
| 7,843,327 B1* | 11/2010 | DiMartino | ......... | G08B 13/1409 340/505 |
| 8,447,863 B1* | 5/2013 | Francis, Jr. | ............. | H04W 4/02 709/226 |
| 9,121,703 B1* | 9/2015 | Droz | ......................... | G01C 3/08 |
| 9,558,663 B2* | 1/2017 | Breed | ..................... | G08G 1/162 |
| 2010/0190069 A1* | 7/2010 | Tanaka | .............. | H01M 8/04007 429/428 |
| 2013/0141578 A1* | 6/2013 | Chundrlik, Jr. | .... | G06K 9/00791 348/148 |
| 2014/0088761 A1* | 3/2014 | Shamlian | ............. | G05D 1/0227 700/253 |

(Continued)

FOREIGN PATENT DOCUMENTS

| CN | 101183265 A | 5/2008 |
|---|---|---|
| CN | 101243367 A | 8/2008 |

(Continued)

OTHER PUBLICATIONS

Milella, Annalisa, et al. "RFID tag bearing estimation for mobile robot localization." Advanced Robotics, 2009. ICAR 2009. International Conference on. IEEE, 2009. 6 pages (Year: 2009).*

(Continued)

*Primary Examiner* — Manav Seth
(74) *Attorney, Agent, or Firm* — Anova Law Group, PLLC (57) ABSTRACT

A location-based control method includes detecting an identifier having a distance to a movable machine less than a pre-set distance threshold and triggering a control operation on the movable machine. The triggered control operation is associated with the identifier.

9 Claims, 9 Drawing Sheets

(56) References Cited

U.S. PATENT DOCUMENTS

2014/0168420 A1   6/2014   Naderhirn et al.

FOREIGN PATENT DOCUMENTS

| CN | 101398689 A | 4/2009 |
|---|---|---|
| CN | 101619984 A | 1/2010 |
| CN | 102508489 A | 6/2012 |
| CN | 102621984 A | 8/2012 |
| CN | 103093162 A | 5/2013 |
| CN | 103123682 A | 5/2013 |
| CN | 103226354 A | 7/2013 |
| CN | 103268119 A | 8/2013 |
| CN | 104062630 A | 9/2014 |
| CN | 204287962 U | 4/2015 |
| JP | H0886011 A | 4/1996 |
| JP | H1185981 A | 3/1999 |
| JP | H11296227 A | 10/1999 |
| JP | 2001005524 A | 1/2001 |
| JP | 2002059389 A | 2/2002 |
| JP | 2003241833 A | 8/2003 |
| JP | 2003330538 A | 11/2003 |
| JP | 2005121641 A | 5/2005 |
| JP | 2005242409 A | 9/2005 |
| JP | 2006236109 A | 9/2006 |
| KR | 20100111795 A | 10/2010 |
| WO | 2009036176 A1 | 3/2009 |

OTHER PUBLICATIONS

The World Intellectual Property Organization (WIPO) International Search Report for PCT/CN2014/090085 dated Aug. 14, 2015 6 Pages.

Zheng, Rui, et al., A 2D Code for Mobile Robot Localization and Navigation in Indoor Environments, Chinese High Technology Letters, Apr. 2008, pp. 369-374.

Dong, Xiao-Ming, Research of Mobile Robots Accurate Localization Based on Stereo Vision, Journal of Anqing Teachers College (Natural Science Edition), Nov. 2013, 4 pages.

Tian, Guo-Hui, et al., Robot Navigation in a Large Scale Environment Based on Distributed Navigation Information, Journal of Shandong University (Engineering Science), Feb. 2011, pp. 24-32.

* cited by examiner

LOCATION-BASED CONTROL METHOD AND APPARATUS, MOVABLE MACHINE AND ROBOT

CROSS-REFERENCE TO RELATED APPLICATION

This is a continuation application of International Application No. PCT/CN2014/090085, filed on Oct. 31, 2014, the entire contents of which are incorporated herein by reference.

TECHNICAL FIELD

The present disclosure relates to the technical field of computer control, and in particular to a location-based control method and apparatus, a movable machine and a robot.

BACKGROUND

Most machines that can move automatically or semi-automatically, such as robots, remote control cars, or even remote control aircrafts, may all determine the locations thereof through various existing positioning technologies, thus executing different processing operations according to the determined locations.

At present, the positioning technology used by most of the above-mentioned mobile machines is GPS (Global Positioning System) positioning technology; however, GPS is prone to a situation in which a poor signal prevents fulfilling of a user's positioning requirements in some situations. In an indoor scenario, for example, the GPS signal is generally not available and cannot provide the positioning service at all, and thus cannot meet the user's location-based machine control requirements.

SUMMARY

The embodiments of the present disclosure provide a location-based control method and apparatus, a movable machine and a robot, which can control movable machines, such as robots, based on the location accurately, quickly, and with low costs.

In accordance with the disclosure, there is provided a location-based control method including detecting an identifier having a distance to a movable machine less than a pre-set distance threshold and triggering a control operation on the movable machine. The triggered control operation is associated with the identifier.

In some embodiments, detecting the identifier includes detecting the identifier based on a proximity information reading technology.

In some embodiments detecting the identifier includes photographing an environment image comprising an image of a plane having a distance to the movable machine less than the pre-set distance threshold, and analyzing and recognizing the identifier from the photographed environment image.

In some embodiments, analyzing and recognizing the identifier from the photographed environment image includes analyzing and recognizing color information from the photographed environment image and determining the analyzed and recognized color information as the identifier if a color indicated by the analyzed and recognized color information is a designated color.

In some embodiments, analyzing and recognizing the identifier from the photographed environment image includes analyzing and recognizing color information from the photographed environment image and determining the analyzed and recognized color information as the identifier if a color indicated by the analyzed and recognized color information is a designated color and a dimension of a region where the color is located satisfies a condition.

In some embodiments, photographing the environment image includes detecting an environment brightness within a pre-set distance range, turning on a configured illumination source and adjusting a brightness of the illumination source if the detected environment brightness is lower than a pre-set threshold value, and photographing the environment image within the pre-set distance range.

In some embodiments, triggering the control operation on the movable machine generating a response instruction associated with the identifier, sending the generated response instruction to a server, receiving a control instruction returned by the server in response to the response instruction, and controlling the movable machine according to the received control instruction.

Also in accordance with the disclosure, there is provided a control apparatus including a detector configured to detect an identifier having a distance from a movable machine less than a pre-set distance threshold and a controller configured to trigger a control operation on the movable machine. The triggered control operation is associated with the identifier.

In some embodiments, the detector includes a proximity communication circuit configured to detect the identifier based on a proximity information reading technology.

In some embodiments, the detector includes a photographing device configured to photograph an environment image comprising an image of a plane having a distance to the movable machine less than the pre-set distance threshold value and an analyzer configured to analyze and recognize the identifier from the photographed environment image.

In some embodiments, the analyzer is further configured to analyze and recognize color information from the photographed environment image, and determine the analyzed and recognized color information as the identifier if a color indicated by the analyzed and recognized color information is a designated color.

In some embodiments, the analyzer is further configured to analyze and recognize color information from the photographed environment image, and determine the analyzed and recognized color information as the identifier if a color indicated by the analyzed and recognized color information is a designated color and a dimension of a region where the color is located satisfies a condition.

In some embodiments, the photographing device is further configured to detect an environment brightness within a pre-set distance range, turn on a configured illumination source and adjust a brightness of the illumination source if the detected environment brightness is lower than a pre-set threshold value, and photograph the environment image within the pre-set distance range.

In some embodiments, the controller includes an instruction generator configured to generate a response instruction associated with the identifier, a transmitter configured to send the generated response instruction to a server, and a controlling circuit configured to receive a control instruction returned by the server in response to the response instruction, and control the movable machine according to the received control instruction.

In the embodiments of the present disclosure, the location of a movable machine to be controlled can be determined relatively accurately according to an identifier in proximity of the movable machine to be controlled, and the operation control on the movable machine to be controlled can be further completed relatively accurately, thereby avoiding the occurrence of a misoperation to a certain extent, and allowing low implementation costs.

DETAILED DESCRIPTION OF THE EMBODIMENTS

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

In the embodiments of the present disclosure, an identifier at a relatively near location can be collected by means of image recognition, proximity communication technology, etc., then the current location of this terminal is determined relatively accurately, and then different control operations are executed according to the determined current location. For example, with regard to some contest robots, operations, such as executing competitive state recovery, after the robot arrives at a certain location region, can be implemented by means of the method according to the embodiments of the present disclosure.

Figure 1:
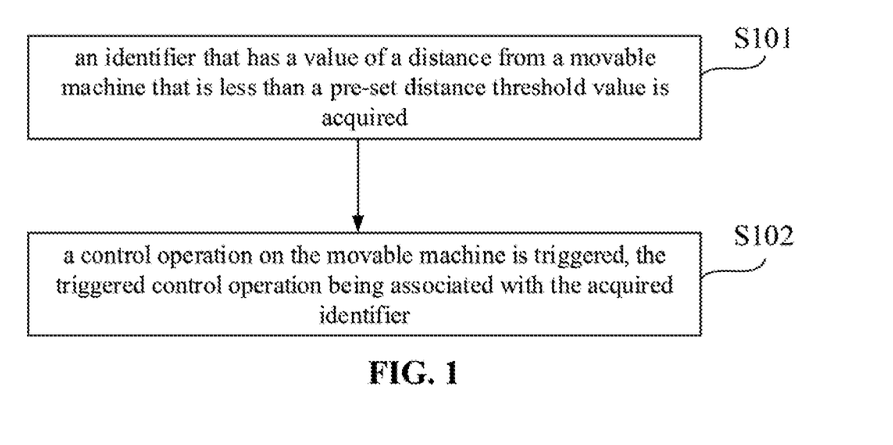
FIG. 1 is a flowchart of a control method in the embodiments of the present disclosure.

Please refer to FIG. 1, which is a flowchart of a control method in the embodiments of the present disclosure. The method in the embodiments of the present disclosure may be implemented in a controller connected to a movable machine such as a robot or a UAV (Unmanned Aerial Vehicle). Specifically, the method comprises:

S101: an identifier that has a value of a distance from a movable machine that is less than a pre-set distance threshold value is acquired. In this disclosure, acquiring an identifier may refer to detecting or locating the identifier so that a location of the identifier can be determined or acquired.

Information carried in some cards fixed in a particular region may be induced and read based on proximity information reading technologies, such as NFC (Near Field Communication) and contactless RFID (Radio Frequency Identification). It is ensured that a value of a distance between a read identifier and a movable machine is less than a distance threshold value based on the characteristics of proximity information reading technologies.

A camera may also be invoked to photograph a plane located in the proximity, so as to collect and obtain image information about the plane, and then acquire an identifier for identifying a location region from the image information.

Acquiring an identifier for marking a location region from an image may comprise: if the photographed image comprises a region having a particular color and/or a particular shape, then taking the region having a particular color and/or a particular shape as the identifier for marking the location region; or if the photographed image comprises a graphic code carrying relevant information (a two-dimensional code, a barcode, etc.), then parsing the graphic code to obtain the identifier for marking the location region.

In order to ensure that the collected plane image is near enough, the camera may be arranged at the bottom of the movable machine, such as a robot, and the plane comprising the identifier is the ground. During the movement of the movable machine, the camera at the bottom can photograph an image of the ground in real time (or at intervals), and then extract an identifier being capable of representing the current location of this movable machine. Alternatively, a proximity sensor, e.g. an ultrasonic sensor, located in the same plane and with the same orientation as that of the camera may also be arranged, and when the proximity sensor senses a relatively near plane, the camera is enabled to photograph an image of the relatively near plane. For example, the camera and the ultrasonic sensor are arranged at the same side of the movable machine, and when having detected a plane (wall) within a distance of 10 cm, the camera starts photographing the plane and acquires a corresponding identifier so as to determine the current location of the movable machine.

S102: a control operation on the movable machine is triggered, the triggered control operation being associated with the acquired identifier.

After the identifier is collected, a corresponding control operation may be executed according to the identifier. In the embodiments of the present disclosure, different identifiers may be associated with different control operations. Specifically, with regard to the identifier in the image collected by the camera, if an image region comprising a particular color has been recognized in S101, then a control operation may be performed on the movable machine according to an operation indicated by the image having a particular color.

The identifier may be specifically used for marking the location region, and when it is recognized that the plane image comprises a green image region, the contest robot would know that it has arrived at a state recovery region, and may initiate an operation, such as virtual life value recovery, on this contest robot.

In S102, a control operation on the movable machine may be directly initiated, such as the above-mentioned virtual life value recovery operation. It may also send a request (such as a virtual life value recovery request) to a central control server after the identifier is acquired, and the central control server completes a relevant control operation.

In other embodiments, the method in the embodiments of the present disclosure may also be implemented in the aforementioned central control server, and the central control server may perform the operation control on a plurality of movable machines managed thereby. In S101, the server may specifically analyze a proximity image uploaded by each movable machine or information collected by the NFC, so as to determine whether a corresponding identifier exists;

and if so, then a control operation may be performed on a corresponding movable machine based on the identifier in S102.

In the embodiments of the present disclosure, the location of a movable machine can be determined relatively accurately according to an identifier in proximity of the movable machine, and the operation control on the movable machine can be further completed relatively accurately, thereby avoiding the occurrence of a misoperation to a certain extent, and allowing low implementation costs.

Figure 2:
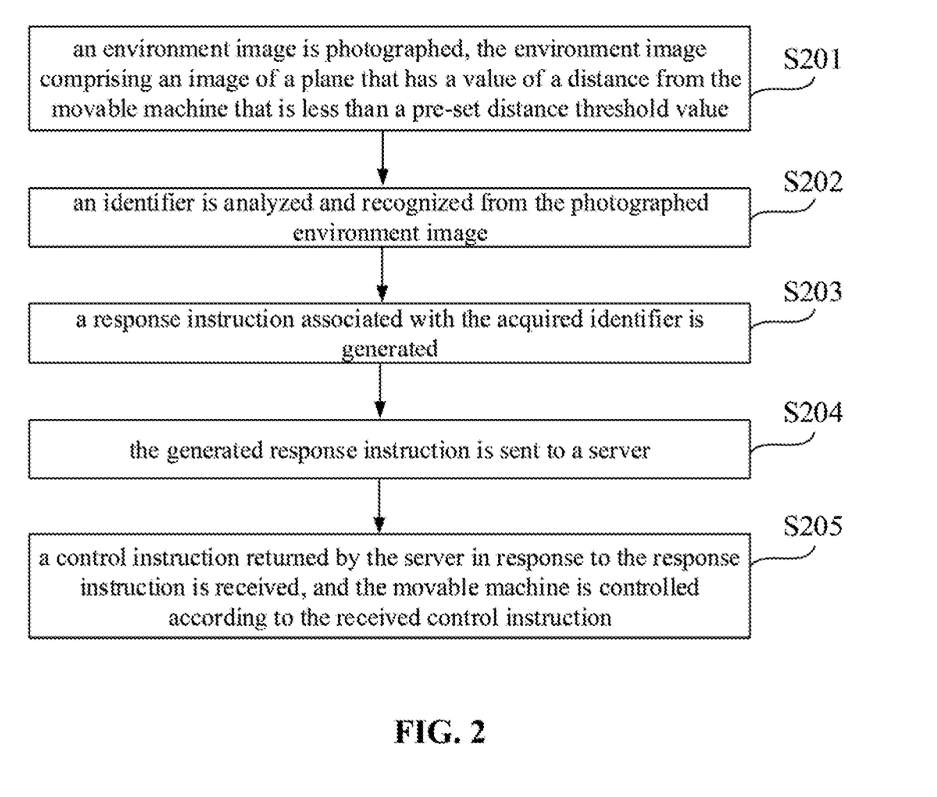
FIG. 2 is a flowchart of another location-based control method in the embodiments of the present disclosure.

Please then refer to FIG. 2, which is a flowchart of another location-based control method in the embodiments of the present disclosure. The method in the embodiments of the present disclosure may be implemented in a controller connected to a movable machine, such as a robot. Specifically, the method comprises:

S201: an environment image is photographed, the environment image comprising an image of a plane that has a value of a distance from the movable machine that is less than a pre-set distance threshold value.

During the movement of the movable machine, such as a robot, a plane in proximity of the movable machine is detected currently via a proximity sensor, such as an ultrasonic proximity sensor, and once a plane having the distance that is less than the pre-set distance threshold value is detected, for example, a plane within 10 cm, the camera may be triggered to photograph an image of the plane, so as to recognize an identifier.

It may also be ensured that the distance between the plane where the photographed image is located and the movable machine is relatively near by means of installing the camera at a particular location of the movable machine. Specifically, the camera may be installed at the bottom of the movable machine, so as to only photograph an image of the ground, so that it can be ensured that the distance between the plane where the photographed image is located and the movable machine is relatively near.

S202: an identifier is analyzed and recognized from the photographed environment image.

The image may be analyzed and recognized according to a pixel value of each pixel point, so as to determine identifiers comprised in the image. These identifiers constituted by colors, etc. may specifically be used for representing regions where the colors are located. For example, a region corresponding to a green identifier is a state recovery region, red represents entering a dangerous region, etc.

In the embodiment of the present disclosure, the identifiers may be implemented by means of some designated colors.

S202 may specifically comprise: analyzing and recognizing color information from the photographed environment image, and if a color indicated by the analyzed and recognized color information is a designated color, then taking the analyzed and recognized color information as the identifier. There may be a variety of designated color values, such as the above-mentioned green and red. The color values may be obtained based on the calculation of pixel points in the image. The user may configure a current movement site of the movable machine, and a region having a particular color is configured to be large enough for relevant color information to be accurately collected and recognized.

Alternatively, S202 may specifically comprise: analyzing and recognizing color information from the photographed environment image, and if a color indicated by the analyzed and recognized color information is a designated color and the dimension of a region where the color is located satisfies a condition, then taking the analyzed and recognized color information as the identifier. The color information comprises a color and the dimension of a region where the color is located in the image. There may be a variety of designated color values, such as the above-mentioned green and red. The condition to be satisfied by the dimension comprises: the dimension being a designated geometrical shape, such as a circle and a rectangle. Both the color value and the dimension may be obtained based on the calculation of pixel points in the image. By means of a combination of the color and the dimension, the accuracy of color information can be better ensured.

A user may directly fix different colors of cards, ribbons, etc. on planes such as floors and walls, in some designated location regions, or may directly add different colored patterns on planes such as floors and walls.

S203: a response instruction associated with the acquired identifier is generated.

With regard to different identifiers, different response instructions are executed. For example, a green identifier indicates a state recovery region, and when the green identifier is detected, it is illustrated that the movable machine enters the state recovery region currently. In this embodiment of the present disclosure, a response instruction carrying the green identifier may be generated and sent to a server, and the server determines that a control instruction of state recovery needs to be sent to the movable machine according the green identifier.

S204: the generated response instruction is sent to a server.

S205: a control instruction returned by the server in response to the response instruction is received, and the movable machine is controlled according to the received control instruction.

The communication with the server may be performed in a wired or wireless manner.

It needs to be noted that, in other embodiments, a response instruction associated with the identifier recognized in S202 may be directly generated without using the server, and an operation instruction for state recovery is produced to control a relevant module to recover an initial state. For example, indicator lights for indicating a life value of a robot are all lit up so as to represent the state recovery of the robot.

Figure 3:
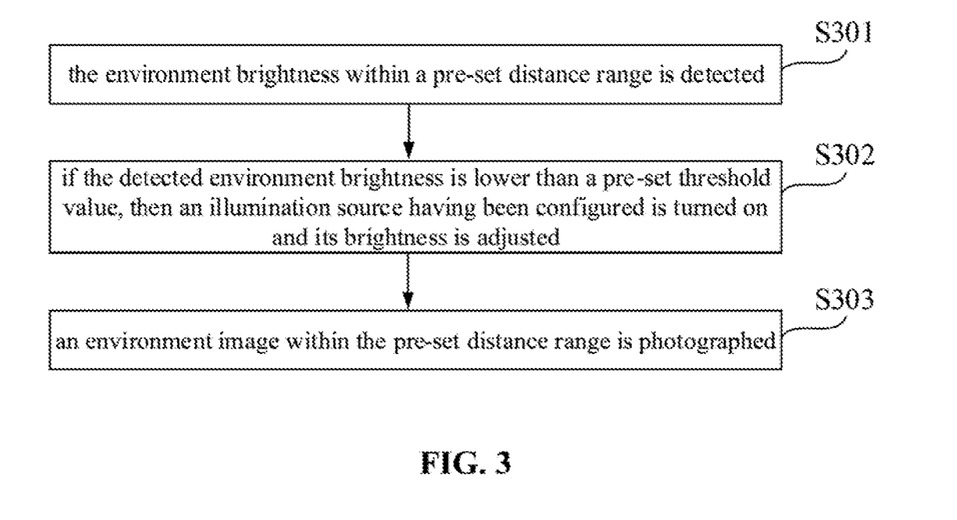
FIG. 3 is a flowchart of a method for photographing a plane image in the embodiments of the present disclosure.

Furthermore, please refer to FIG. 3, the method for photographing a plane image may specifically comprise the steps as follows:

S301: the environment brightness within a pre-set distance range is detected.

S302: if the detected environment brightness is lower than a pre-set threshold value, then an illumination source having been configured is turned on and its brightness is adjusted.

S303: an environment image within the pre-set distance range is photographed.

Before a photograph is taken by a camera, the brightness of the surrounding environment may be sensed via a brightness sensor, and when the environment is relatively dark, the brightness of the environment is increased by controlling an independent illumination source, so as to be able to photograph a relatively good image in any light environment. The independent illumination source may be a high-brightness LED light, which may be controlled based on PWM, and the brightness of the LED light is adjusted by changing the duty cycle of the PWM to illuminate the bottom or the surrounding environment of the movable machine, such as the robot, so as to better photograph the environment image within the pre-set distance range.

In the embodiments of the present disclosure, an identifier in proximity of a movable machine may be acquired by means of photographing, so as to determine the location of the movable machine relatively accurately, and to further complete the operation control on the movable machine relatively accurately, thereby avoiding the occurrence of a misoperation to a certain extent, and allowing low implementation costs.

Figure 4:
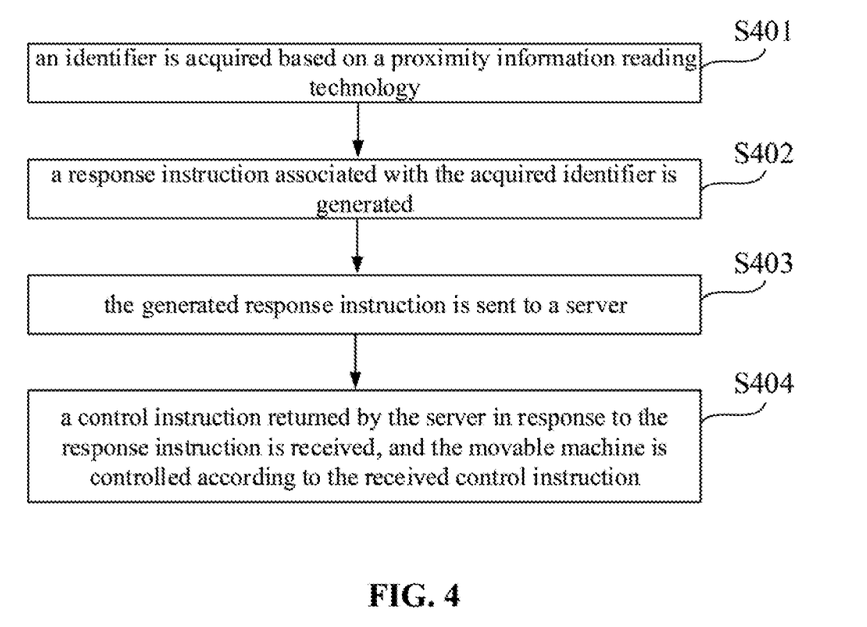
FIG. 4 is a flowchart of still another location-based control method in the embodiments of the present disclosure.

Please then refer to FIG. 4, which is a flowchart of yet another location-based control method in the embodiments of the present disclosure. The method in the embodiments of the present disclosure may be implemented in a controller connected to a movable machine, such as a robot. Specifically, the method comprises:

S401: an identifier is acquired based on a proximity information reading technology.

Specifically, various cards, etc. matching with modules using NFC or RFID, for example, may be arranged in a designated location region, and may be fixed at locations on a floor or a wall or the like simply by means of pasting, etc., and proximity information reading modules using NFC or RFID, for example, which can be conveniently configured, read relevant information about these cards to acquire an identifier.

S402: a response instruction associated with the acquired identifier is generated.

S403: the generated response instruction is sent to a server.

S404: a control instruction returned by the server in response to the response instruction is received, and the movable machine is controlled according to the received control instruction.

In the embodiments of the present disclosure, an identifier in proximity of a movable machine may be acquired by means of proximity information reading technology, so as to determine the location of the movable machine relatively accurately, and to further complete the operation control on the movable machine relatively accurately, thereby avoiding the occurrence of a misoperation to a certain extent, and allowing low implementation costs.

A control apparatus, a movable machine, and a robot in the embodiments of the present disclosure are hereinafter described.

Figure 5:
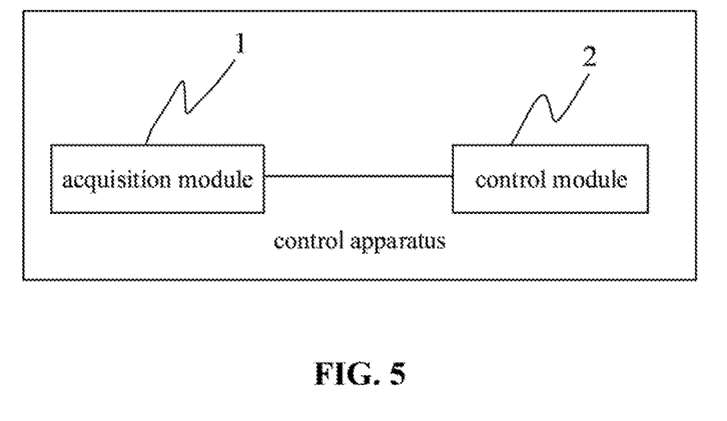
FIG. 5 is a structural schematic diagram of a control apparatus in the embodiments of the present disclosure.

Please refer to FIG. 5, which is a structural schematic diagram of a control apparatus in the embodiments of the present disclosure. The apparatus in the embodiments of the present disclosure may be configured on a movable machine, such as a robot, a remote control car, or even an aircraft. Specifically, the apparatus may comprise:

an acquisition module 1, e.g., a detector, for acquiring an identifier that has a value of a distance from a movable machine that is less than a pre-set distance threshold value; and a control module 2, e.g., a controller, for triggering a control operation on the movable machine, the triggered control operation being associated with the acquired identifier.

The acquisition module 1 may sense and read information carried in some cards fixed in a particular region based on proximity information reading technologies, such as NFC and contactless radio frequency identification (RFID). It is ensured that a value of a distance between a read identifier and a movable machine is less than a distance threshold value based on the characteristics of proximity information reading technologies.

The acquisition module 1 may also invoke a camera to photograph a plane located in the proximity, so as to collect and obtain image information about the plane, and then acquire an identifier for identifying a location region from the image information.

The acquisition module 1 acquiring an identifier for marking a location region from an image may comprise: if the photographed image comprises a region having a particular color and/or a particular shape, then taking the region having a particular color and/or a particular shape as the identifier for marking the location region; or if the photographed image comprises a graphic code carrying relevant information (a two-dimensional code, a barcode, etc.), then parsing the graphic code to obtain the identifier for marking the location region.

In order to ensure that the collected plane image is near enough, the camera may be arranged at the bottom of the movable machine, such as a robot, and the plane comprising the identifier is the ground During the movement of the movable machine, the camera arranged at the bottom can photograph an image of the ground in real time (or at intervals), and then extract an identifier being capable of representing the current location of this movable machine. Alternatively, a proximity sensor, e.g. an ultrasonic sensor, located in the same plane and with the same orientation as that of the camera may also be arranged, and when the proximity sensor senses a relatively near plane, the camera is enabled to photograph an image of the relatively near plane. For example, the camera and the ultrasonic sensor are arranged at the same side of the movable machine, and when having detected a plane (wall) within a distance of 10 cm, the camera starts photographing the plane and acquires a corresponding identifier so as to determine the current location of the movable machine.

After the acquisition module 1 collects the identifier, the control module 2 may execute a corresponding control operation according to the identifier in the embodiments of the present disclosure, different identifiers may be associated with different control operations at this moment. Specifically, with regard to the identifier in the image collected by the camera, if the acquisition module 1 has recognized an image region comprising a particular color, then the control module 2 may perform a control operation on the movable machine according to an operation indicated by a green image.

For example, the identifier may be used for marking the location region, and when it is recognized that the plane image comprises a green image region, the contest robot would know that it has arrived at a state recovery region, and may initiate an operation, such as virtual life value recovery, on this contest robot.

The control module 2 may directly initiate a control operation on the movable machine, such as the above-mentioned virtual life value recovery operation. It may also send a request (such as a virtual life value recovery request) to a central control server after the identifier is acquired, and the central control server completes a relevant control operation.

Figure 6:
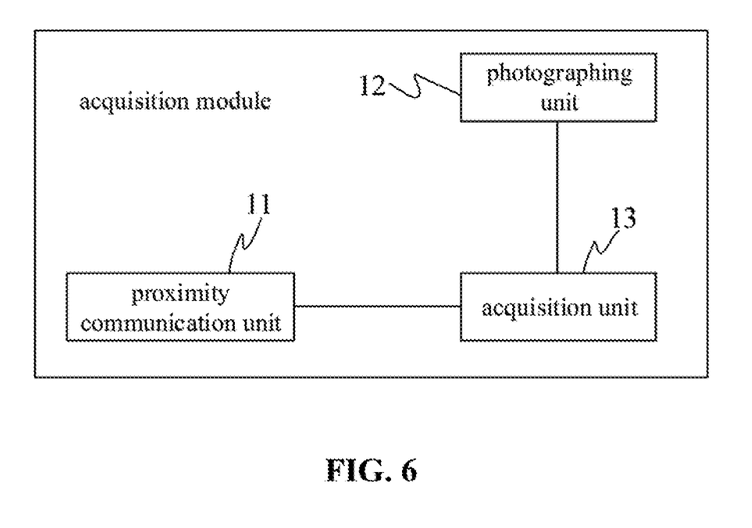
FIG. 6 is a structural schematic diagram of the acquisition module in FIG. 5.

Furthermore, optionally, as shown in FIG. 6, the acquisition module 1 comprises:

a proximity communication unit 11, e.g., a proximity communication circuit, for acquiring an identifier for marking a location region based on proximity information reading technology.

In addition, as shown in FIG. 6, the acquisition module 1 may further comprise:

a photographing unit 12, e.g., a photographing device such as a camera, for photographing an environment image, the environment image comprising an image of a plane that has a value of a distance from the movable machine that is less than a pre-set distance threshold value; and an acquisition unit 13, e.g., an analyzer, for analyzing and recognizing the identifier from the photographed environment image.

Optionally, the acquisition module 13 is specifically used for analyzing and recognizing color information from the photographed environment image, and if a color indicated by the analyzed and recognized color information is a designated color and the dimension of a region where the color is located satisfies a condition, then taking the analyzed and recognized color information as the identifier.

Alternatively, the acquisition unit 13 is specifically used for analyzing and recognizing color information from the photographed environment image, and if a color indicated by the analyzed and recognized color information is a designated color, then taking the analyzed and recognized color information as the identifier.

Optionally, the photographing unit 12 is specifically used for detecting the environment brightness within a pre-set distance range; if the detected environment brightness is lower than a pre-set threshold value, then turning on and adjusting the brightness of an illumination source having been configured; and photographing an environment image within the pre-set distance range.

Specifically, the acquisition module 1 may comprise the proximity communication unit 11 and a combination of the photographing unit 12 and the acquisition unit 13 at the same time, or may comprise only the proximity communication unit 11 or comprise only a combination of the photographing unit 12 and the acquisition unit 13. Specifically, the acquisition module may be configured according to the user's requirements.

Figure 7:
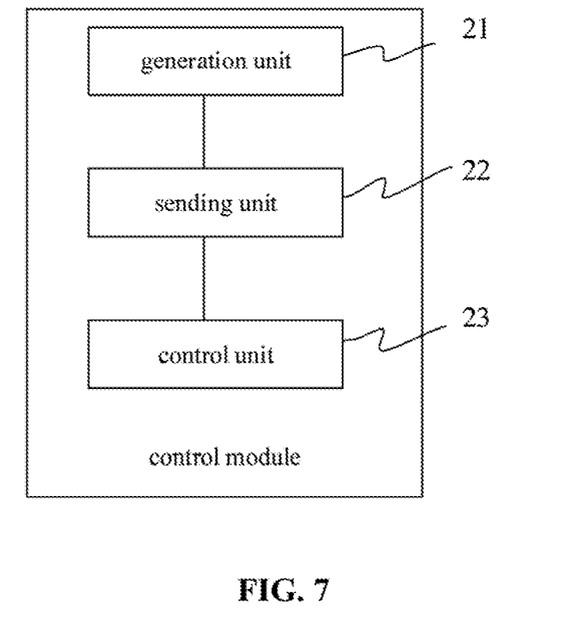
FIG. 7 is a structural schematic diagram of the control module in FIG. 5.

Furthermore, optionally, as shown in FIG. 7, the control module 2 may comprise:

a generation unit 21, e.g., an instruction generator, for generating a response instruction associated with the acquired identifier;

a sending unit 22, e.g., a transmitter, for sending the generated response instruction to a server; and a control unit 23, e.g., a controlling circuit, for receiving a control instruction returned by the server in response to the response instruction, and controlling the movable machine according to the received control instruction.

The specific implementation of various modules and units in the movable machine in the embodiments of the present disclosure can refer to the description of the embodiments corresponding to FIG. 1 to FIG. 4.

In the embodiments of the present disclosure, the location of a movable machine can be determined relatively accurately according to an identifier in proximity of the movable machine, and the operation control on the movable machine can be further completed relatively accurately, thereby avoiding the occurrence of a misoperation to a certain extent, and allowing low implementation costs.

Figure 8:
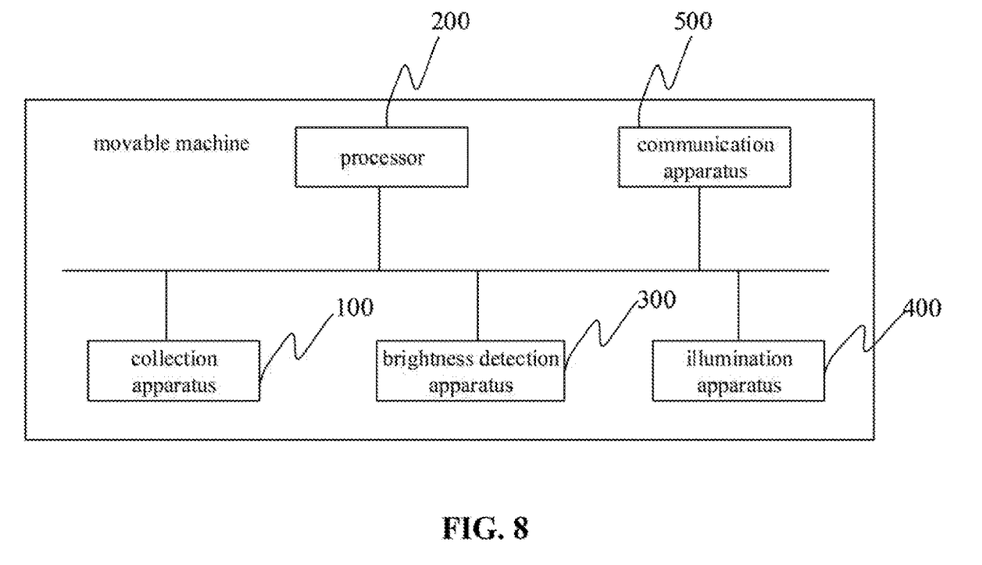
FIG. 8 is a structural schematic diagram of a movable machine in the embodiments of the present disclosure.
Figure 9:
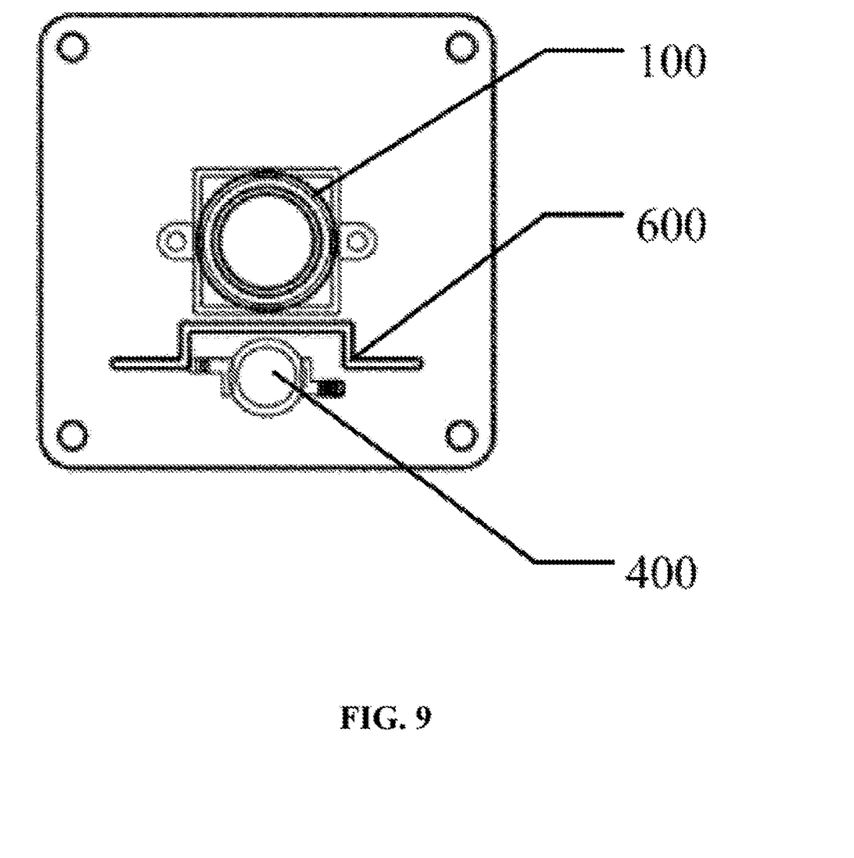
FIG. 9 is a structural schematic diagram of a specific movable machine in the embodiments of the present disclosure.

Please then refer to FIG. 8 and FIG. 9, which are structural schematic diagrams of a movable machine in the embodiments of the present disclosure. The movable machine in the embodiments of the present disclosure may be a device, such as a robot, a remote control car, or even an aircraft. Specifically, the movable machine in the embodiments of the present disclosure comprises: a collection apparatus 100 and a processor 200, the collection apparatus 100 being used for collecting an external identifier, e.g., collecting information or data associated with the external identifier; and the processor 200 being used for acquiring an identifier that has a value of a distance from the movable machine that is less than a pre-set distance threshold value via the collection apparatus, and triggering a control operation on this movable machine, the triggered control operation being associated with the acquired identifier.

Specifically, the collection apparatus 100 comprises: a near field communication module, and/or a contactless radio frequency identification module. Alternatively, the collection apparatus 100 comprises various types of wireless card readers.

Specifically, the collection apparatus 100 may also comprise: a shooting module; and the processor 200 is used for acquiring an environment image via the collection apparatus 100, and analyzing and recognizing the identifier from the photographed environment image, the environment image comprising an image of a plane that has a value of a distance from the movable machine that is less than a pre-set distance threshold value. The collection apparatus 100 shown in FIG. 9 is a shooting module.

Furthermore, specifically, the processor 200 is specifically used for analyzing and recognizing color information from the photographed environment image, and if a color indicated by the analyzed and recognized color information is a designated color and the dimension of a region where the color is located satisfies a condition, then taking the analyzed and recognized color information as the identifier.

Alternatively, the processor 200 is specifically used for analyzing and recognizing color information from the photographed environment image, and if a color indicated by the analyzed and recognized color information is a designated color, then taking the analyzed and recognized color information as the identifier.

Furthermore, specifically, the device in the embodiments of the present disclosure may further comprise: a brightness detection apparatus 300 and an illumination apparatus 400;

the brightness detection apparatus 300 is used for detecting the environment brightness; and the processor 200 is used for controlling the turn-on and adjustment of the illumination brightness of the illumination apparatus 400 when it is detected by the brightness detection apparatus that the environment brightness within a pre-set distance range is lower than a pre-set threshold value, and controlling the collection apparatus 100 to photograph the environment image within the pre-set distance range.

Furthermore, specifically, the movable machine in the embodiments of the present disclosure may further comprise: a communication apparatus 500; and the processor 200 is specifically used for generating a response instruction associated with the acquired identifier, sending the generated response instruction to a server via the communication apparatus 500 and receiving a control instruction returned by the server in response to the response instruction, and controlling this movable machine according to the received control instruction.

Furthermore, specifically, please refer to FIG. 9, the movable machine in the embodiments of the present disclosure further comprises:

a thermal insulation component 600 configured between the illumination apparatus 400 and the collection apparatus 100 to isolate the collection apparatus 100 from the heat produced by the illumination apparatus 400.

The collection apparatus 100 shown in FIG. 9 is a camera.

In the embodiments of the present disclosure, the location of a movable machine can be determined relatively accurately according to an identifier in proximity of the movable machine, and the operation control on the movable machine can be further completed relatively accurately, thereby avoiding the occurrence of a misoperation to a certain extent, and allowing low implementation costs.

The embodiments of the present disclosure further provide a robot, specifically comprising: a robot body and a movement controller, the movement controller being used for acquiring an identifier that has a value of a distance from the robot body that is less than a pre-set distance threshold value, and triggering a control operation on the robot, the triggered control operation being associated with the acquired identifier.

Specifically, the specific implementation of the movement controller can refer to the description of the embodiments corresponding to FIG. 1 to FIG. 9.

In the embodiments of the present disclosure, the location of a movable machine can be determined relatively accurately according to an identifier in proximity of the movable machine, and the operation control on the movable machine can be further completed relatively accurately, thereby avoiding the occurrence of a misoperation to a certain extent, and allowing low implementation costs.

In the several embodiments provided in the present disclosure, it should be understood that the disclosed relevant apparatus and method may be implemented in other manners. For example, the apparatus embodiments described above are merely illustrative. For example, the division of modules or units is merely a logical function division, and there may be other division methods in actual implementation. For example, a plurality of units or components may be combined or may be integrated into another system, or some features may be omitted or not be executed. In another aspect, the coupling, direct coupling or communicative connection therebetween which is displayed or discussed may be an indirect coupling or communicative connection of some interfaces, apparatuses or units, and may be electrical, mechanical or in other forms.

The units described as separate parts may or may not be physically separate, and the parts displayed as units may or may not be physical units, that is, may be located in one place, or may also be distributed on multiple network elements. Some or all of the units may be selected according to actual needs to achieve the objectives of the solutions of the embodiments.

In addition, various functional units in various embodiments of the present disclosure may be integrated into one processing unit, or each of the units may exist alone physically, or two or more units may be integrated into one unit. The integrated unit may be implemented in the form of hardware or may be implemented in the form of a software function unit.

When the integrated unit is implemented in the form of a software function unit and sold or used as an independent product, the integrated unit may be stored in a computer-readable storage medium. Based on this understanding, the part of the technical solutions of the present disclosure which substantially contributes to the present disclosure over the prior art or all or part of the technical solutions may be embodied in a form of a computer software product, and the computer software product is stored in a storage medium, comprising various instructions for causing a computer processor to perform all or some of the steps of the method of individual embodiments of the present disclosure. Moreover, the aforementioned storage medium comprises: any medium that is capable of storing program codes, such as a U-disk, a portable hard disk, a read-only memory (ROM), a random access memory (RAM), a magnetic disk or an optical disc.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A location-based control method, comprising:
   detecting a plane in proximity to a movable machine using a proximity sensor;
   in response to a distance between the plane and the movable machine being less than a pre-set distance threshold, photographing an environment image comprising an image in the plane using a camera with a same orientation as that of the proximity sensor;
   analyzing and recognizing color information from the photographed environment image;
   identifying a region in the environment image having a particular shape and a designated color;
   determining an identifier according to the designated color of the identified region;
   determining a currently located region of the movable machine according to the identifier; and
   triggering a control operation on the movable machine, the triggered control operation being associated with the identifier marking the currently located region.

2. The method of claim 1, wherein the photographing the environment image comprises:
   detecting an environment brightness within a pre-set distance range;
   if the detected environment brightness is lower than a pre-set threshold value, turning on a configured illumination source and adjusting a brightness of the illumination source; and
   photographing the environment image within the pre-set distance range.

3. The method of claim 1, wherein the triggering the control operation on the movable machine comprises:
   generating a response instruction associated with the identifier;
   sending the generated response instruction to a server;
   receiving a control instruction returned by the server in response to the response instruction; and
   controlling the movable machine according to the received control instruction.

4. A control apparatus, comprising:
   a proximity sensor configured to detect a plane in proximity to a movable machine;
   a photographing device with a same orientation as that of the proximity sensor, configured to photograph an environment image comprising an image in the plane if a distance between the plane and the movable machine is less than a pre-set distance threshold;
   a detector configured to: analyze and recognize color information from the photographed environment image; identify a region in the environment image having a designated shape and a designated color within a plurality of designated colors; determine an identifier according to the designated color of the identified region, and determine a currently located region of the movable machine according to the identifier; and a controller configured to trigger a control operation on the movable machine, the triggered control operation being associated with the identifier.

5. The apparatus of claim 4, wherein the photographing device is further configured to:
   detect an environment brightness within a pre-set distance range,
   if the detected environment brightness is lower than a pre-set threshold value, turn on a configured illumination source and adjust a brightness of the illumination source, and
   photograph the environment image within the pre-set distance range.

6. The apparatus of claim 4, wherein the controller comprises:
   an instruction generator configured to generate a response instruction associated with the identifier;
   a transmitter configured to send the generated response instruction to a server; and
   a controlling circuit configured to receive a control instruction returned by the server in response to the response instruction, and control the movable machine according to the received control instruction.

7. The method of claim 1, wherein the identifier corresponds to a state recovery zone and the triggered control operation is associated with the movable machine operating in the state recovery zone.

8. The method of claim 1, wherein the proximity sensor is an ultrasonic sensor.

9. The control apparatus of claim 4, wherein the proximity sensor is an ultrasonic sensor.

* * * * *